(12) United States Patent
Redmond et al.

(10) Patent No.: US 11,733,094 B2
(45) Date of Patent: Aug. 22, 2023

(54) COMPACT COMPUTATIONAL SPECTROMETER USING SOLID WEDGED LOW FINESSE ETALON

(71) Applicant: Massachusetts Institute of Technology, Cambridge, MA (US)

(72) Inventors: Shawn Redmond, Concord, MA (US); Patrick Hassett, Nashua, NH (US); Salvatore Di Cecca, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/546,631

(22) Filed: Dec. 9, 2021

(65) Prior Publication Data

US 2022/0252452 A1 Aug. 11, 2022

Related U.S. Application Data

(60) Provisional application No. 63/147,615, filed on Feb. 9, 2021.

(51) Int. Cl.
  *G01J 3/02* (2006.01)
  *G01J 3/28* (2006.01)
  *G01J 3/453* (2006.01)

(52) U.S. Cl.
  CPC ........... *G01J 3/0256* (2013.01); *G01J 3/2823* (2013.01); *G01J 2003/283* (2013.01); *G01J 2003/4538* (2013.01)

(58) Field of Classification Search
  CPC .......... G01J 3/0256; G01J 3/2823; G01J 3/26; G01J 3/45; G01J 2003/283; G01J 2003/4538; G01J 2003/1234
  See application file for complete search history.

(56) References Cited

U.S. PATENT DOCUMENTS

| | | | |
|---|---|---|---|
| 9,513,166 B2 * | 12/2016 | Marchant | ................... G01J 3/26 |
| 9,664,563 B2 | 5/2017 | Lucey | |
| 9,989,413 B1 | 6/2018 | Ungnapatanin | |
| 10,337,920 B2 | 7/2019 | Cabib | |

(Continued)

FOREIGN PATENT DOCUMENTS

WO WO-2014140189 A2 * 9/2014 ............ G01J 3/0205

OTHER PUBLICATIONS

Redmond, S. M., and M. A. Smith. Compact Solid Etalon Computational Spectrometer: FY19 Optical Systems Technology Line-Supported Program. MIT Lincoln Laboratory, 2019.) (Year: 2019).*

(Continued)

*Primary Examiner* — Tarifur R Chowdhury
*Assistant Examiner* — Carlos Perez-Guzman
(74) *Attorney, Agent, or Firm* — Smith Baluch LLP

(57) ABSTRACT

A two-layer hybrid solid wedged etalon was fabricated and combined with a traditional imager to make a compact computational spectrometer. The hybrid wedge was made of $Nb_2O_5$ and Infrasil 302 and was designed to operate from 0.4-2.4 μm. Initial demonstrations used a CMOS imager and operated from 0.4-0.9 μm with spectral resolutions <30 cm$^{-1}$ from single snapshots. The computational spectrometer operates similarly to a spatial Fourier Transform infrared (FTIR) spectrometer with spectral reconstruction using a non-negative least squares fitting algorithm based on analytically computed wavelength response vectors determined from extracted physical thicknesses across the entire two-dimensional wedge. This computational technique resulted in performance and spectral resolutions exceeding those that could be achieved from Fourier techniques. With an additional imaging lenses and translational scanning, the system can be converted into a hyperspectral imager.

20 Claims, 12 Drawing Sheets

(56) References Cited

U.S. PATENT DOCUMENTS

| | | | |
|---|---|---|---|
| 10,739,197 B2 | 8/2020 | Lucey | |
| 11,415,460 B2 | 8/2022 | Lucey | |
| 2002/0048294 A1* | 4/2002 | Newman | H01S 3/03 372/32 |
| 2009/0073451 A1* | 3/2009 | TeKolste | G01J 3/18 356/454 |
| 2011/0228279 A1 | 9/2011 | Lucey | |
| 2014/0329274 A1* | 11/2014 | Bowen | G01N 33/58 250/281 |
| 2018/0080824 A1 | 3/2018 | Lucey | |
| 2018/0095207 A1* | 4/2018 | Jidai | G01J 3/36 |
| 2020/0348180 A1* | 11/2020 | Hong | G01J 3/0229 |
| 2021/0190588 A1 | 6/2021 | Lucey | |

OTHER PUBLICATIONS

Bone et al., "Fringe-pattern analysis using a 2-D Fourier transform," Applied Opt., 25(10), 1653-1660 (1986).

Hartmann et al., "Waveguide-Integrated Broadband Spectrometer Based on Tailored Disorder," Adv Optical Mater., 8, 1901602 (2020), 8 pages.

Lawson et al. "Linear least squares with linear inequality constraints." Solving least squares problems (1974): 158-173.

Lucey et al., "A Fabry-Perot interferometer with a spatially variable resonance gap employed as a Fourier transform spectrometer," Proc. SPIE 8048, Algorithms and Technologies for Multispectral, Hyperspectral and Ultraspectral Imagery XVII, 80480K (2011), 10 pages.

Redding et al., "All-fiber spectrometer based on speckle pattern reconstruction," Opt. Express 21(5), 6584-6600 (2013).

Redmond et al. "Compact computational spectrometer using a solid wedged low finesse etalon." Applied Optics 60.15 (2021): 4375-4382.

Tack et al., "A compact, high-speed, and low-cost hyperspectral imager," Proc. SPIE 8266, Silicon Photonics VII, 82660Q (2012), 14 pages.

* cited by examiner

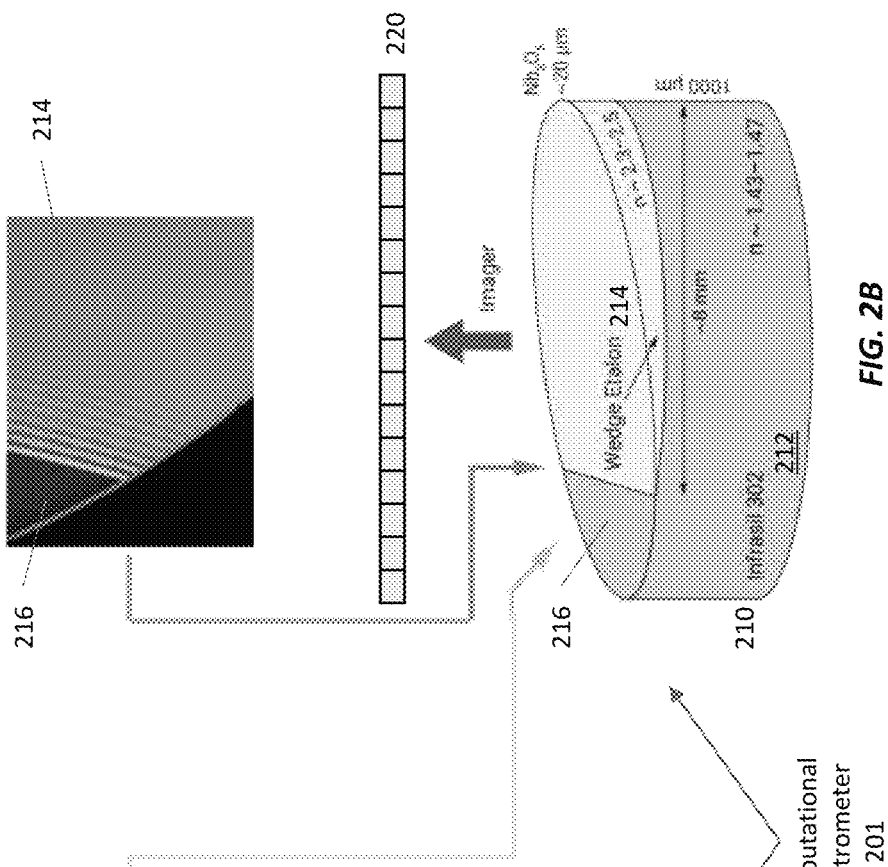
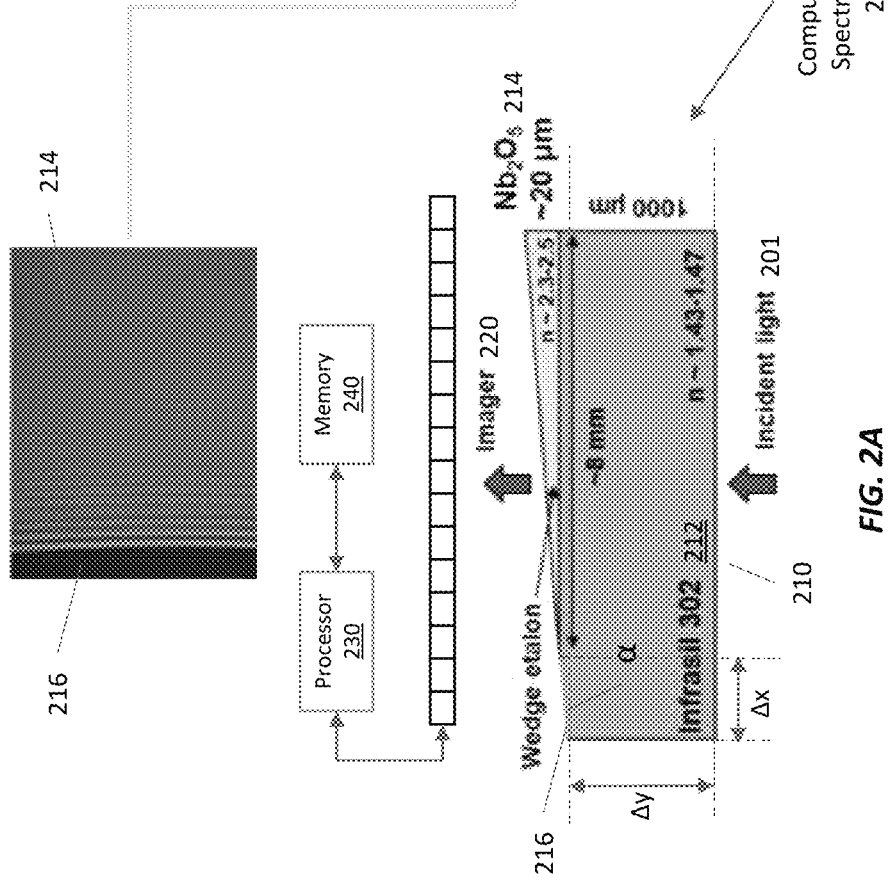

COMPACT COMPUTATIONAL SPECTROMETER USING SOLID WEDGED LOW FINESSE ETALON

CROSS-REFERENCE TO RELATED APPLICATION(S)

This application claims the priority benefit, under 35 U.S.C. § 119(e), of U.S. Application No. 63/147,615, which was filed on Feb. 9, 2021, and is incorporated herein by reference.

GOVERNMENT SUPPORT

This invention was made with government support under FA8702-15-D-0001 awarded by the U.S. Air Force. The government has certain rights in the invention.

BACKGROUND

Spectrometers, as instruments that measure the amount of light present in different spectral bands (i.e., wavelengths or colors), are typically characterized by the detectable spectral band, spectral resolution, minimum detectable light level, and size, weight, and power (SWaP). Often achieving high performance for one metric comes at the expense of others. For example, achieving fine spectral resolution typically requires either a large spectrometer or a compact spectrometer with high input brightness. Grating, or similar, dispersive-based spectrometers usually have optical components with large dispersions, long system lengths, and large apertures in order to achieve fine spectral resolution typically driving system expense and volume.

Filter-based spectrometers, such as high-finesse etalons, offer advantages in small configurations but lose in sensitivity by passing light only within filter passbands and rejecting light outside those passbands. Their spectral resolution is also limited by the widths of the filter passbands.

Recently a different class of spectrometers using waveguides combined with scattering, diffraction, and/or speckle offer perhaps the most compact spectrometers often combined with fine spectral resolution. The etendue, however, is restricted to single-mode waveguide properties and they are restricted in operational spectral bandwidth.

A Fourier Transform infrared (FTIR) spectrometer is based on interference and operates by adjusting the path length of one arm of an interferometer while recording the response with a single detector. An FTIR spectrometer benefits from both Fellgett's advantage and Jacquinot's advantage and therefore has better sensitivity than other spectrometers. However, an FTIR spectrometer has moving components and collects data over long periods of time, increasing system complexity and cost. A spatial FTIR spectrometer operates on a similar principle as an FTIR spectrometer but has no moving parts and records the entire interferogram on a detector array in a single measurement. Spatial FTIR spectrometers offer a path towards simultaneously achieving high performance in conventional spectrometer metrics but to date have not seen widespread use.

Perhaps the simplest FTIR spectrometer is a wedged etalon that maps the interferogram linearly to be sensed by a linear detector array. This approach has been demonstrated using an air-gap wedge between two tilted transparent substrates. The detected spectrum can be reconstructed using traditional Fourier-based reconstruction methods. Although a simple implementation of a spatial FTIR spectrometer, an air-gap etalon or wedge spectrometer suffers the deleterious effects of multiple reflections from the substrates forming the wedge, limitations on how close the wedge can be to the imager, and reduction in performance with air as the etalon material.

SUMMARY

Using a solid wedge etalon in a spectrometer improves the spectral resolution by an amount proportional to the index of refraction squared for a fixed incident collection angle. This can lead to nearly an order of magnitude improvement in the spectral resolution using materials with an index of refraction near three. Additionally, by removing substrates from both sides of the solid wedge etalon, the solid wedge etalon can be located close to the imager, maintaining the fidelity of the spatial interferogram. This solid wedge etalon can be used as a spatial wavelength encoding optical element to measure large spectral bandwidths with fine spectral resolution simultaneously. Additionally, using a physical analytical model process, the spectrum can be reconstructed from the raw output with finer spectral resolution and fewer spectral artifacts than with Fourier-based reconstruction techniques.

A solid wedge etalon spectrometer conceptually can be used for any spectral band, including the visible (VIS), near infrared (NIR), short-wave infrared (SWIR), medium-wave infrared (MWIR), and long-wave infrared (LWIR), assuming appropriate wedge etalon materials, dimensions and detector are selected. Unfortunately, an etalon wedge designed to operate across the entire VIS/SWIR spectral band (0.4-2.4 μm) would have a minimum thickness on the order of tens of nanometers, which is too thin for a single element practical device. Fortunately, a two-layer hybrid solid wedge etalon, also called a two-layer, composite, or hybrid wedge (etalon), can operate over the entire VIS/SWIR spectral band with fine spectral resolution. A two-layer wedge etalon for this spectral band can be made of a thin, high-index wedge layer on top of a transparent substrate with a lower index of refraction and can operate over a band of 0.4-2.4 μm with better performance than similar air-gap etalons.

Generally, the high-index wedge layer and substrate should have refractive indices of ≥2 and ≤1.5, respectively, with coefficients of thermal expansion that are within about 30% of each other and absorptions of less than about 10% over the operating wavelength range. (Alternatively, the wedge layer can have a lower refractive index than the substrate.) The high-index wedge layer and substrate should each have an index uniformity better than one part per thousand. The thickest and thinnest edges of the high-index wedge layer may have thickness of up to 30 μm and down to tens of nanometers, respectively, whereas the substrate may about 1 mm or 2 mm thick (thick enough to provide mechanical integrity). The thicknesses of the wedge layer and substrate scale directly with the intended wavelengths of operation and are thicker for longer wavelengths, e.g., MWIR and LWIR.

The physical analytical model approach can be used to extract the actual thicknesses of each layer in the as-built two-layer hybrid solid wedge. This thickness information can be determined with an accuracy better than the difference in thickness between neighboring detector array pixels across the entire two-dimensional surface. This accurate thickness information combined with the full wavelength-dependent index of refraction can subsequently be used to generate analytical wavelength basis vectors for use in a non-negative least squares spectral reconstruction technique that provides up to an order of magnitude improvement in spectral resolution compared to standard FTIR processing techniques. The substrate in the two-layer wedge etalon provides multiple functions: first, it provides structural integrity for the high-index wedge layer and second, it provides a higher degree of orthogonality of the wavelength basis vectors for the least-squares fitting step.

A single- or two-layer wedge etalon can be integrated with a detector array to form a spectrometer or used with an image relay telescope. Additionally, the spectrometer based on a single- or two-layer wedge etalon can be converted into a hyperspectral imager with the addition of an imaging lens in front of the single- or two-layer wedge etalon that images test scenes onto the two-layer wedge etalon. Linearly translating the hyperspectral imager with respect to the test scene such that each ground or scene pixel gets individually detected by the detector pixels across the wedge dimension provides information for reconstructing the spectra for each scene pixel.

For hyperspectral imaging, the detector scans across the scene, capturing an image every time the scene translates by one detector pixel. After a given scene pixel has been scanned across the entire wedge etalon, the spectra can be extracted from the acquired images. For example, if the wedge etalon spans 500 detector pixels, then imager would scan the scene moving the scene pixel through all 500 detector pixels, capturing and processing 500 images.

Each measurement can be considered with respect to a row of detector pixels that corresponds to a single row of the wedge etalon, from the thin side to the thick side. The signal or measurement vector includes measured values from each pixel in the detector. The physical analytical model is used to generate expected signal vectors assuming idealized single wavelengths spanning the full operational spectral bandwidth of the spectrometer. For example, if the spectrometer operates over 400-1000 nm with 1 nm spectral resolution, then it generates 601 expected signal vectors (one for each spectral bin). These serve as basis vectors for a non-negative fitting process to determine the combination and magnitudes of the basis vectors to fit the detected signal vectors. The output of this is the fitting process is the spectral illumination for that scene pixel.

An inventive spectrometer may include a solid wedge etalon, a detector array, and a processor. The solid wedge etalon includes a wedged layer (or high-index layer) having a first refractive index (e.g., of at least 2) disposed on a substrate having a second refractive index (e.g., of 1.5 or less) lower than the first refractive index. In operation, the solid wedge etalon generates a spatial interference pattern from a polychromatic object. The detector array, which is in optical communication with the solid wedge etalon, detects the spatial interference pattern generated by the solid wedge etalon. The processor, which is operably coupled to the detector array, reconstructs a spectrum of the polychromatic object based at least in part on the spatial interference pattern and on a model of a spectral response of the solid wedge etalon. The model of the spectral response of the solid wedge etalon is based at least in part on a minimum thickness of the solid wedge etalon, a maximum thickness of the solid wedge etalon, and a wedge angle of the solid wedge etalon.

The wedged layer's maximum thickness can be about 10 microns to about 500 microns. Similarly, the substrate's maximum thickness can be about 1 millimeter to about 10 millimeters. And the wedge angle can be less than about 1 degree. The wedged layer can be diffusion bonded to the substrate and polished to form the wedge angle of the solid wedge etalon. Alternatively, the wedged layer can be deposited on the substrate and polished to form the wedge angle of the solid wedge etalon. The wedged layer can comprise $TiO_2$, $Nb_2O_5$, ZnS, Si, Ge, and/or ZnSe, and the substrate can comprise Infrasil 302 glass and/or BK7 glass. The wedged layer and the substrate can have thermal coefficients of expansion within 30% of each other.

A portion of the substrate can be polished at the wedge angle and can extend beyond the wedged layer. The substrate can have a thickness that varies away from the wedged layer, in which case the model of the spectral response is based at least in part on the thickness of the substrate. The model of the spectral response can be derived from a monochromatic reference image acquired with the imaging spectrometer, a dispersion of the wedged layer, and a dispersion of the substrate.

A solid wedge etalon comprising a wedged layer having a first refractive index disposed on a substrate having a second refractive index lower than the first refractive index can be used for spectroscopy as follows. A model of a spectral response of the solid wedge etalon is generated from a two-dimensional thickness map of the wedged layer, a dispersion of the wedged layer, a two-dimensional thickness map of the substrate, and a dispersion of the substrate. A detector senses spatial interference patterns generated by imaging a scene through the solid wedge etalon while being scanned across the scene. To do this, the detector may sense light transmitted by the wedged layer and light transmitted through a portion of the substrate extending beyond an edge of the wedged layer. A hyperspectral image of the scene can be generated based on the spatial interference patterns and the model of the spectral response of the solid wedge etalon, e.g., by performing a non-negative least squares fitting.

This method can be extended to include detecting a reference spatial interference pattern generated by imaging a monochromatic image through the solid wedge etalon and determining the two-dimensional thickness map of the wedged layer and the two-dimensional thickness map of the substrate based on the reference spatial interference pattern. Determining the two-dimensional thickness map of the wedged layer may include locating peaks in the reference spatial interference pattern produced by the wedged layer. And determining the two-dimensional thickness map of the substrate may include identifying at least one spatial frequency associated with the substrate in the reference spatial interferogram and determining a thickness of the substrate based on the at least one spatial frequency. In addition, the temperature and/or pointing angle of the solid wedge etalon can be measured and used to adjust the model.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is a profile view of a visible-near infrared (VNIR) VNIR/short-wave infrared (SWIR) two-layer hybrid solid wedge etalon.

FIG. 2B is a perspective view of the two-layer hybrid solid wedge etalon of FIG. 2A.

FIG. 2C is a photograph of a fabricated two-layer hybrid solid wedge etalon under white light illumination showing an edge of the etalon and the boundary between the layers with linear spectral encoding illustrated by the fringes visible through the upper layer.

FIG. 2D is a photograph of a fabricated two-layer hybrid solid wedge etalon under white light illumination showing a central region of the etalon with linear spectral encoding illustrated by the fringes.

DETAILED DESCRIPTION

A single-element wedged etalon with a low finesse (e.g., a finesse of 1.5 to 3) can generate wavelength-dependent interference for spectral reconstruction. When operating with a low finesse due to low reflectivity of the wedge surfaces, the interference pattern created immediately beyond the wedge is determined primarily from the beam propagating straight through the wedge and the first beam reflected by the wedge. In the limit that the reflectivity of each wedge surface approaches zero, the wavelength-dependent interference is sinusoidal and well-suited for simple Fourier techniques, albeit possibly at the expense of the depth of modulation, or signal contrast, of the interference pattern. In the other extreme, as the finesse, or similarly reflectivity of each wedge surface, increases, the number of beams to generate the interference pattern increases along with the depth of modulation. Increasing the depth of modulation of the interference pattern directly increases the sensitivity but the larger number of beams reduces the effective field of view, or acceptance angle, of the wedge etalon. This reduces the effective throughput, or etendue. Surface reflectivities of about 20% to 40% per wedge surface offers a good trade between these two competing effects.

Figures 1A, 1B:
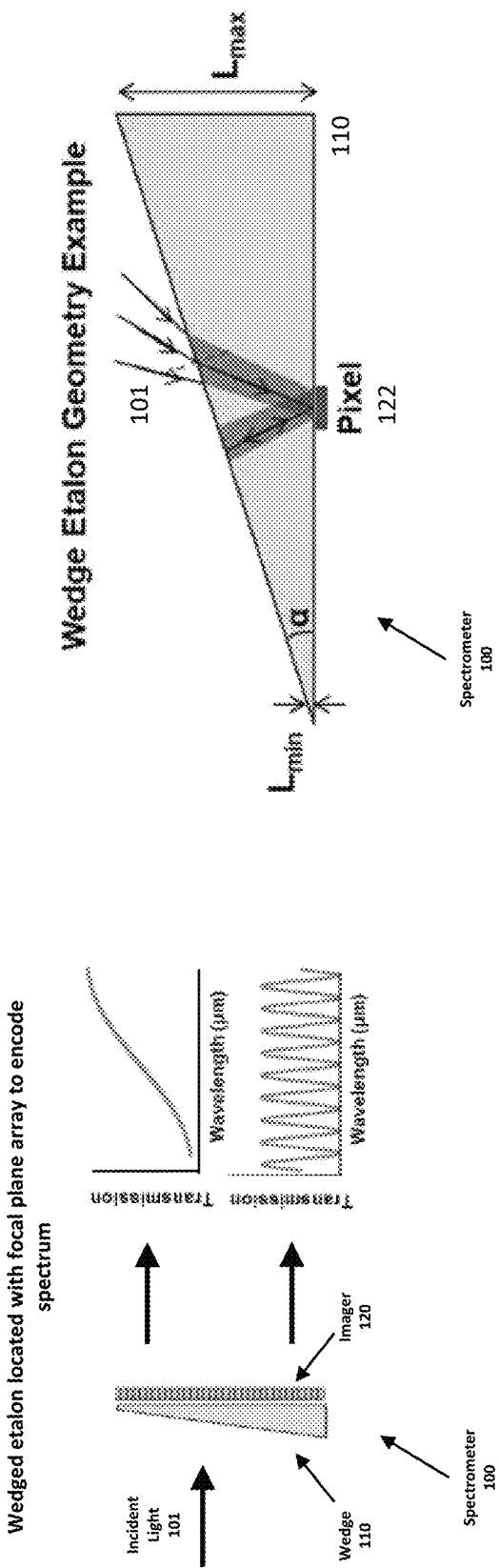
FIG. 1A is a schematic illustration of a single-layer solid wedge etalon linear spectral encoding and detection by linear detector array.
FIG. 1B shows parameters of a single-layer solid wedge etalon for linear spectral encoding.

FIGS. 1A and 1B show, schematically, the components of a solid compact wedge etalon spectrometer 100 and the wavelength encoding mechanism. Incident light 101 passes through a wedged etalon 110 and is detected by a pixelated detector array 120 placed against or close to one surface of the wedged etalon 110. The incident light 101 refracts through an input surface of the wedged etalon 110, as shown in FIG. 1B, and propagates to a point on an output surface of the wedged etalon 110. Some of the light refracts through the output surface to a pixel 122 in the detector array 120, and some of the light reflects between the input and output surfaces as indicated by the double-headed arrow, creating an interference or fringe pattern that is sensed by the pixels 122 in the detector array 120. As a result, the light detected by the detector array 120 is comprised of both a wavelength-dependent interference pattern and an unmodulated background. Near the thin edge of the wedge 110, the transmission versus wavelength is a slowly changing function (upper right plot in FIG. 1A) that evolves into a rapidly changing function as the wedge thickness increases (lateral position changes) (lower right plot in FIG. 1B).

(The wedge 110 can also operate in reflection, with a double-pass geometry where light propagates through the wedge 110 to a reflective surface (not shown), which may be deposited on the wedge 110. The light reflects off this surface back through the wedge 110 to the detector 120.)

A different, yet equivalent, way of viewing the encoding is for the case of a single wavelength illumination. This creates an oscillating interference pattern across the detector array with the distance between consecutive maximums, or minimums, linearly proportional to the wavelength of illumination. If the oscillation pattern were a pure sinusoid, as is the case in a FTIR spectrometer, then the same processing techniques as used in standard a FTIR spectrometer could be applied. However, the transmission function of the wedge etalon 110 is not a pure sinusoid, motivating the use of different reconstruction techniques, discussed below. Finally, although there is a wavelength-specific encoding occurring due to the wedge 110, the wedge 110 transmits all wavelengths. This is the same multiplexing advantage, also known as Fellgett's advantage, that FTIR spectrometers benefit from. Fellgett's advantages applies to the wedge etalon spectrometer 100 in FIGS. 1A and 1B, making the wedge etalon spectrometer 100 a high-throughput computational spectrometer.

FIG. 1B also illustrates several parameters of the wedged etalon 110. The thinnest side of the wedge 110 has a thickness $L_{min}$ and determines the shortest detectable wavelength. For visible (VIS) and short-wave infrared (SWIR) spectral bands, this may be essentially equivalent to the operational spectral bandwidth of the spectrometer 100. The thickest side of the wedge 110 has a thickness $L_{max}$ and determines the spectral resolution, in wavenumbers, of the spectrometer 100 similarly to an FTIR. The wedge angle, a, determines the spatial period of the interference pattern, which is used along with the size of the pixels to ensure an adequate number of pixels are sampling the interference pattern. To satisfy the Nyquist sampling criterion, there should be at least two detector pixels for the shortest spatial period of the interference pattern, which is created by the shortest wavelength.

FIG. 1B also shows that the spatial interference pattern exists only in close proximity to the exit facet of the wedge 110 due to the spatial divergence of the exiting beams. This is one of the practical benefits of using a solid etalon over an air-gap etalon: the etalon can be brought closer to the detector array 120. Similarly, for solid etalons, the effective thicknesses of the wedge 100 is increased by the index of refraction, n. This improves both the spectral resolution and angular field of view. As an example, for an air-gap wedge etalon and a solid etalon designed to operate with the same angular field of view, the solid etalon has an $n^2$ increase in spectral resolution over the air-gap etalon. This can be up to an order of magnitude increase for wedge materials with index of refractions greater than three.

A Two-Layer Hybrid Solid Wedge Etalon

A solid wedge etalon designed to operate across the entire VIS/SWIR spectral band may have a minimum thickness on the order of tens of nanometers. Unfortunately, making a single-element wedge etalon with such a thin edge is difficult because the thin edge is very fragile. Using a two-layer wedge etalon can overcome this problem, enabling operation over the entire VIS/SWIR band, allows close access to one side of the wedge for detecting the spatial interference pattern, and provides structural integrity to the thin edge of the wedge. Such a two-layer hybrid solid wedge should satisfy the following criteria:

(1) Both layers should be made of materials that are transmissive across entire operational spectral band;
(2) The wedge material should have largest index of refraction possible (e.g., in the range of 2.5 to 4) to provide the desired balance of wedge finesse (e.g., ranging from 1-3) and finest spectral resolution for a given angular field of view;
(3) The substrate layer should have an index as close to 1 as possible to maintain a large depth of modulation for the interference pattern;
(4) The index homogeneity of both materials should be sufficient to maintain the fidelity of wedge designed interference pattern (e.g., a variation of $<10^{-3}$ in each material); and
(5) The substrate should be thick enough to provide structural integrity and to act as an etalon whose output is easily distinguishable from that of the high-index wedge layer.

For the VNIR/SWIR portion of the electromagnetic spectrum, these criteria can be met simultaneously with a hybrid wedge etalon made by depositing or diffusion bonding a thick, optical quality high-index layer of $TiO_2$, $Nb_2O_5$, ZnS (e.g., Cleartran), or another suitable material onto an optically polished low index substrate of Infrasil 302 glass, BK7 glass, or another suitable material, then polishing the high-index layer to the desired wedge angle α (e.g., 0.10°, 0.15°, 0.20°, 0.25°, 0.30°, 0.35°, and so on up to about 1.0°) and maximum thickness of the high-index layer (e.g., 10 μm, 20 μm, 30 μm, 40 μm, or 50 μm for the VNIR/SWIR). The high-index layer and low-index substrate may have matching or similar coefficients of thermal expansion (CTEs; e.g., CTEs within 5%, 10%, 15%, 20%, 25%, or 30% of each other) to aid in deposition of the high-index layer on the substrate. Two-layer wedge etalons for other wavelengths may be made of other materials, such as Ge, Si, or ZnSe for the high-index wedge layer, and/or have different dimensions, depending on the wavelength range and refractive indices of the high-index wedge layer and the substrate. For example, the maximum thicknesses of the high-index wedge layer and substrate could be up to 500 μm and up to 10 mm, respectively, for operation in the LWIR.

FIGS. 2A-2D illustrate a computational spectrometer 200 with an example fabricated two-layer solid hybrid wedge etalon 210, detector array 220, processor 230, and memory 240. The computational spectrometer 200 and two-layer hybrid solid wedge etalon 210, which includes a substrate 212 and a high-index layer 214, are configured to operate over the entire VNIR/SWIR spectral band (0.4-2.4 μm). The detector array 220 is opposite the high-index layer 214 (e.g., within 500 μm of the high-index layer 214) and detects an interference pattern produces by illuminating the wedge 210 with incident light 201. The processor 230 is operably coupled to the detector array 220 and the memory 230 and reconstructs the spectrum of the incident light 201 from the detected interference pattern and a model of the wedge 210 stored in the memory 230 as described in greater detail below.

FIGS. 2A and 2B show profile and perspective views of the two-layer hybrid solid wedge etalon 210. It is a ½" diameter wedge with a high-index layer 214 with a maximum thickness of about 20 μm of $Nb_2O_5$ deposited on a substrate 212 of Infrasil 302 with 1 mm thickness. $Nb_2O_5$ has a refractive index of about 2.3-2.5 and Infrasil 302 has a refractive index of about 1.43-1.47 in the VIS/SWIR band. The $Nb_2O_5$ was deposited on the Infrasil 302 using plasma-assisted reactive magnetron sputtering at thicknesses up to 30 μm with no visible crazing or other non-uniformities. The deposited $Nb_2O_5$ layer was mechanically polished to create a high optical quality finish on the high-index wedge layer 214. Wedge angles α between 7 arcminutes and 9 arcminutes were used, and no signs of delamination or cracking were ever observed.

Other material combinations or bonding may meet the design criteria above and offer improved performance over this material combination. Suitable material combinations include high- and low-index optical materials that can be bonded together with no intermediary bonding layer(s) that would alter the magnitude of the reflection between the high- and low-index optical materials or create an additional etalon.

The high-index layer 214 has a thickness that varies from zero to a maximum thickness (here, about 20 μm). The maximum thickness of the high-index layer 214 helps to set the spectral resolution of the spectrometer. Ideally, the thicknesses of the high-index layer 214 should very linearly, but in practice it may vary nonlinearly, e.g., the high-index layer 214 may be somewhat curved or rippled instead of being a perfect wedge. These nonlinearities can be measured or characterized and exploited for finer spectral reconstruction as explained below.

As shown in FIGS. 2A and 2B, the high-index layer extends partially across the substrate 214, leaving a portion 216 of the substrate exposed (e.g., Δx≈1 mm to 2 mm). This portion 216 is polished at the same wedge angle α as the high-index layer 214 and forms an angled facet that is ideally continuous with the exposed surface of the high-index layer 214. It also defines the thinnest portion of the wedge 210; in this example, slightly thinner than 1 mm (e.g., Δy<20 μm).

FIGS. 2C and 2D are images of a finished wedge under white light illumination looking through the wedge 210 with the camera facing the high-index layer 214 (i.e., with the camera in the position of the detector array 220). FIG. 2C shows the boundary between the high-index layer 214 and the exposed facet 216 of the substrate. FIG. 2D shows the intersection between the high-index layer 214, the exposed facet 216 of the substrate, and the edge of the wedge. These images reveal the wavelength encoding behavior as evident by the linear fringes transitioning from white toward individual colors before fading into continuum due to highly oscillating transmission at increasing thicknesses.

Figure 3A:
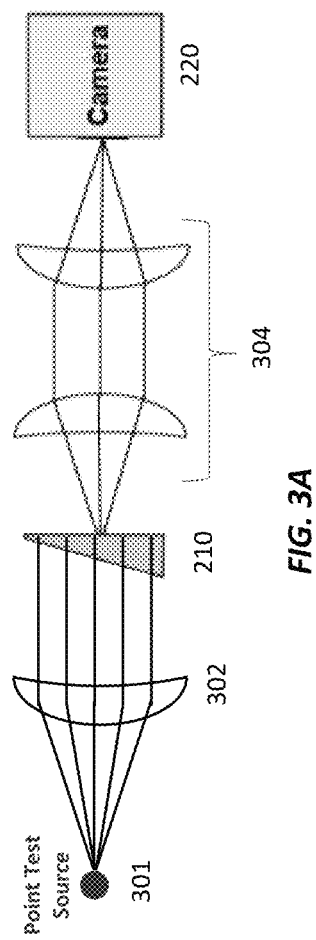
FIG. 3A shows a computational spectrometer with a relay telescope imaging the output face of a single- or two-layer hybrid solid wedge etalon onto a detector array.
Figure 3B:
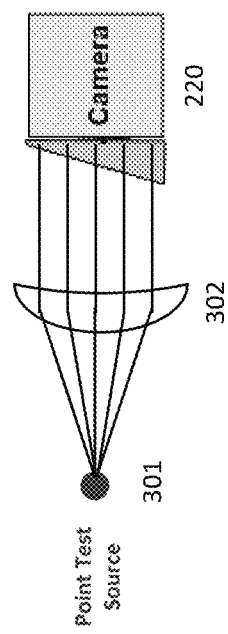
FIG. 3B shows a compact computational spectrometer with either a single- or two-layer hybrid solid wedge etalon integrated with a detector array.

FIGS. 3A and 3B illustrate computational spectrometers with different optical trains imaging a point source 301. FIG. 3A shows a computational spectrometer with a lens 302, two-layer hybrid solid wedge etalon 210, relay telescope 304, and detector array (camera) 220. The relay telescope's magnification can be selected to fill the detector array 220 with light transmitted by the two-layer hybrid solid wedge etalon 210. In the more compact version shown in FIG. 3B, the two-layer hybrid solid wedge etalon 210 is placed up against the detector array 220, eliminating the relay telescope 304.

Figure 4:
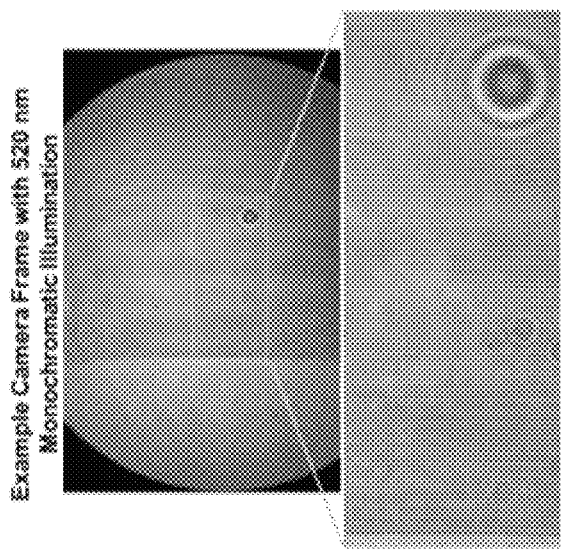
FIG. 4 shows an actual image from a computational spectrometer with a two-layer hybrid solid wedge etalon captured under monochromatic illumination. Approximately the central half of the detector array is used for the computational spectrometer.

FIG. 4 shows a camera frame obtained with a computation spectrometer with the architecture shown in FIG. 3A. The two-layer hybrid solid wedge etalon was one-to-one imaged onto a 1920×1200, 5.86 μm pixel, 10-bit, monochrome CMOS camera with a removed protective window using a 1× Mitutoyo plan apochromatic infinity-corrected objective with complementary tube lens (relay telescope 304). The image relay lenses were fixed to the camera with the wedge oriented with the $Nb_2O_5$ side facing the camera. The wedge was rotated so that its thin edge was aligned with the vertical axis of the camera. The illumination was from a fiber-coupled adjustable collimation lens assembly (lens 302) providing an incident beam of diameter about 25 mm, overfilling the wedge. Different illumination conditions were created by coupling different test light sources into the fiber-coupled collimation lens assembly.

The image of the wedge in FIG. 4 was taken using 520 nm illumination. The entire substrate of the wedge is shown with only the central region, about 1200 pixels by 800 pixels, used as the spectrometer. The inset (bottom) shows the encoded interferogram expected from monochromatic illumination along with additional real-world artifacts of dark pixels, diffraction from various contamination particles on optics, and an imprint from the etalon formed by the Infrasil substrate. Under ideal conditions, the expected pattern should be vertical fringes with equal amplitudes and contrast across the entire image. Due to the beam size, some intensity roll-off is evident towards the edges but this effect can be removed in subsequent processing. Additionally, the computational spectrometer can generate a spectrum from a single row of the image. The other rows provide redundant information. Operating with this much redundancy may decrease the sensitivity by spreading the incident light across multiple rows. The sensitivity can be improved by focusing the fringes in one dimension with cylindrical optics. Spherical optics can be used for easier alignment.

Spectral Reconstruction Processing

Without being bound by any particular theory, the principle of operation of a computational spectrometer with a two-layer wedge etalon is analogous to a spatial FTIR spectrometer in that it generates and spatially samples an interferogram with a multi-element detector array. The spatial interferogram is also periodic for single wavelengths; however, it is not a pure sinusoid as in an FTIR spectrometer. The transmission vs. wavelength function of an etalon strongly depends on the finesse of the etalon. For very small finesses (e.g., finesses less than 0.5), the function is well-approximated by a single sinusoid combined with a DC offset but with has diminishing depth of modulation. As the finesse increases, the functional dependence evolves dramatically to towards narrow transmission peaks separated by the free spectral range with 100% depth of modulation.

For example, a two-layer hybrid solid wedge etalon with reflectivities per surface of about 20-40% and a finesse in the range of about 1.5-3.0 provides a good balance of the depth of modulation and field of view. In this range, the etalon transmission function can still appear to strongly resemble a pure sinusoid with upwards of 90% of the function well-approximated by a single sinusoid. The remaining 10% can create ambiguities and cross-coupling between transmission functions from different wavelengths. Unaddressed, this may limit the performance of the computational spectrometer.

Figure 5:
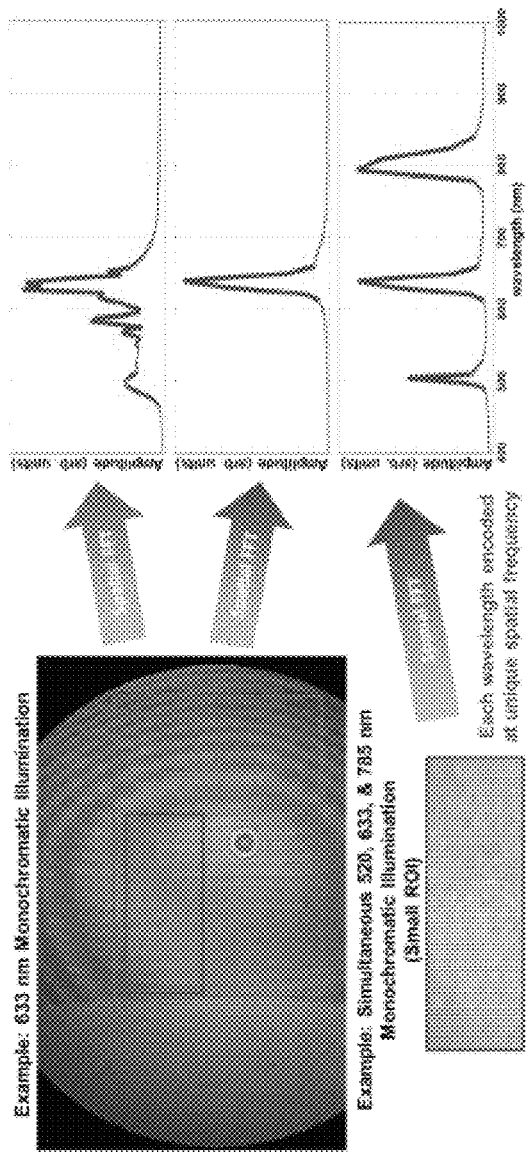
FIG. 5 illustrates limitations of using only Fourier-based spectral reconstruction techniques on images captured by a computational spectrometer with a two-layer hybrid solid wedge etalon. Fourier-processing of a portion of the monochromatic image in the upper left resulted in output spectra show in the upper right. Two different regions of interest have different spectral outputs, both of which are significantly broadened beyond the expected spectral resolution of the spectrometer. The lower left image was taken under illumination with three monochromatic sources with the Fourier-based processed spectral output shown on the lower right. These images and plots show how similarly the spectrometer operates to spatial FTIR but still exhibits significant spectral broadening even under nearly ideal conditions.

FIG. 5 illustrates how ambiguities and cross-coupling affect the performance of a computational spectrometer with a two-layer hybrid solid wedge etalon. FIG. 5 shows an image (upper left) captured by a computational spectrometer under monochromatic illumination from a 633 nm laser. Two different-sized regions of interest are processed using conventional Fourier transform techniques, with the upper right plot showing the spectrum for the larger region and the middle-right plot showing the spectrum for the smaller region. Each spectrum should be a single peak with a width<3 nm based on the etalon design. However, in both cases, the peak is significantly wider and has several side-lobes when using the full region of interest due to amplitude variations and substrate etalon imprint. As a further illustration, FIG. 5 shows a cropped image (lower left) taken with a computational spectrometer illuminated simultaneously by three separate monochromatic sources and the corresponding Fourier-based spectral reconstruction (lower right). While there are spectral reconstruction capabilities for a computational spectrometer with a two-layer hybrid solid wedge etalon spectrometer using only Fourier processing, even under nearly ideal conditions, the etalon transmission function is not purely sinusoidal, so different processing techniques may be used to realize full potential of the wedged etalon spectrometer.

These different processing techniques may use the etalon transmission function itself as the basis, or eigenvector, for reconstructing spectra rather than approximating them with sinusoids used in Fourier techniques or other functions. With the etalon transmission function providing the basis vectors, least squares fitting can be used to reconstruct the spectra by finding a fit to the measured spatial interferograms. This approach, however, still leaves two obstacles. The first is the least squares reconstruction uses a complete set of orthogonal basis vectors to output the correct spectrum robustly, reproducibly, and accurately. The etalon transmission function by itself is not completely orthogonal for different wavelengths; however, the product of two different etalons is a good approximation. Thus, both the thin high-index wedge layer (e.g., formed of $Nb_2O_5$) and the substrate (e.g., formed of Infrasil 302) can be treated as separate etalons and used to generate the basis vectors for spectral reconstruction.

The substrate etalon is designed to complement the thin high-index wedge etalon providing the orthogonality for spectral reconstruction simultaneously with structural support. During testing with the fabricated two-layer etalon, all rows, individually, from the image, had orthogonality checks performed against every permutation of the basis vectors for spectral resolutions over an order of magnitude smaller than predicted by Fourier methods with undetectable correlations. With the orthogonality confirmed, the as-built combined etalon transmission function should be determined. For example, it can be measured for each operational wavelength with matching spectral resolution assuming one or more appropriate illumination sources are available. Alternatively, a physical analytical model can be used to generate the basis vectors for the combined etalon transmission function.

With the physical analytical model approach, if the physical thicknesses of both the wedge layer and substrate are known across the entire wedge, then transmission functions can be computed from analytical etalon theory for arbitrary wavelengths assuming the index of refraction/dispersion is known. The actual thickness accuracy should be on the order of the minimum thickness of the wedge, e.g., tens of nanometers, making separate physical thickness measurements quite challenging.

Figure 6:
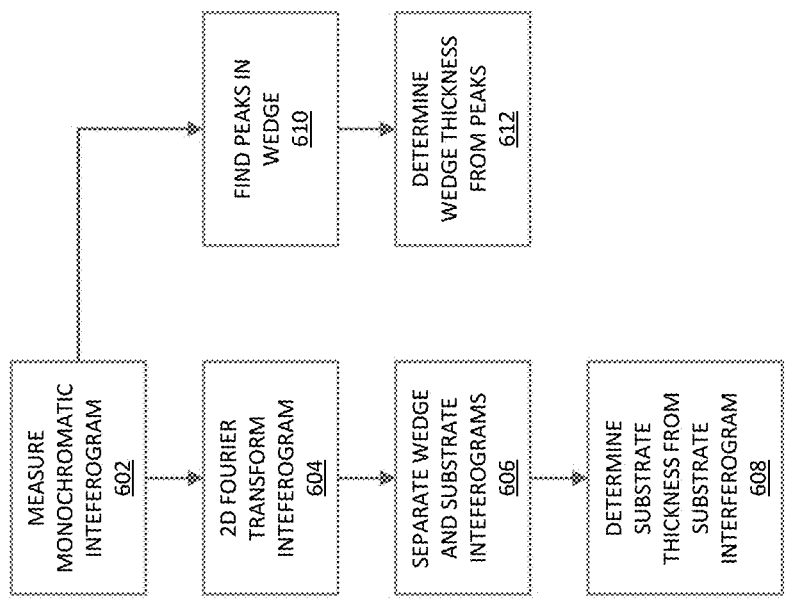
FIG. 6 shows a process for determining the thicknesses of the wedge layer and substrate in a two-layer hybrid solid wedge etalon.

FIG. 6 illustrates a process 600 for determining the actual thicknesses of the wedge and substrate etalons. The process 600 includes acquiring an interferogram of the two-layer hybrid solid wedge etalon with a very narrow linewidth laser, e.g., a HeNe laser (602). This interferogram should have high signal contrast, i.e., high enough to resolve the interferogram over the background. Next, the interferogram is Fourier transformed in two dimensions (604). Since the wedge and substrate complement one another with little to no overlapping spatial frequency content (e.g., because the substrate is at least about ten times thicker than the maximum thickness of the high-index layer), their contributions to the interferogram are separate and distinct in the Fourier domain (606). As a result, the spatial frequencies associated with the substrate can be extracted from the reference spatial interferogram in Fourier domain. The spatially varying thickness of the substrate, including the maximum and minimum thicknesses, can be determined by extracting the phase from the spatial frequencies associated with the substrate portion of the interferogram (608).

With the maximum and minimum thicknesses of the substrate accurately known, the maximum and minimum thicknesses of the thin high-index wedge layer remains. The spatially varying thickness of the wedge layer can be extracted using the same interferogram used to determine the substrate thickness. Due to the narrow linewidth illumination, the interferogram from the wedge layer should be a single-frequency fringe pattern determined by the wedge angle. A peak-finding process finds the locations of the fringes across the wedge layer to within a fraction of a detector pixel (610). Once this location mapping step is completed, a common scaling factor is used to convert the peak locations into a 2D thickness map (612). This 2D thickness map provides accurate thickness of the entire 2D of the high index wedge layer. The 2D high index wedge layer thickness map, 2D substrate thickness map, and wavelength-dependent refractive indices of the wedge and substrate layers can then be used as inputs to a generalized etalon calculation to compute the expected response, or image, for any wavelength.

Figure 7:
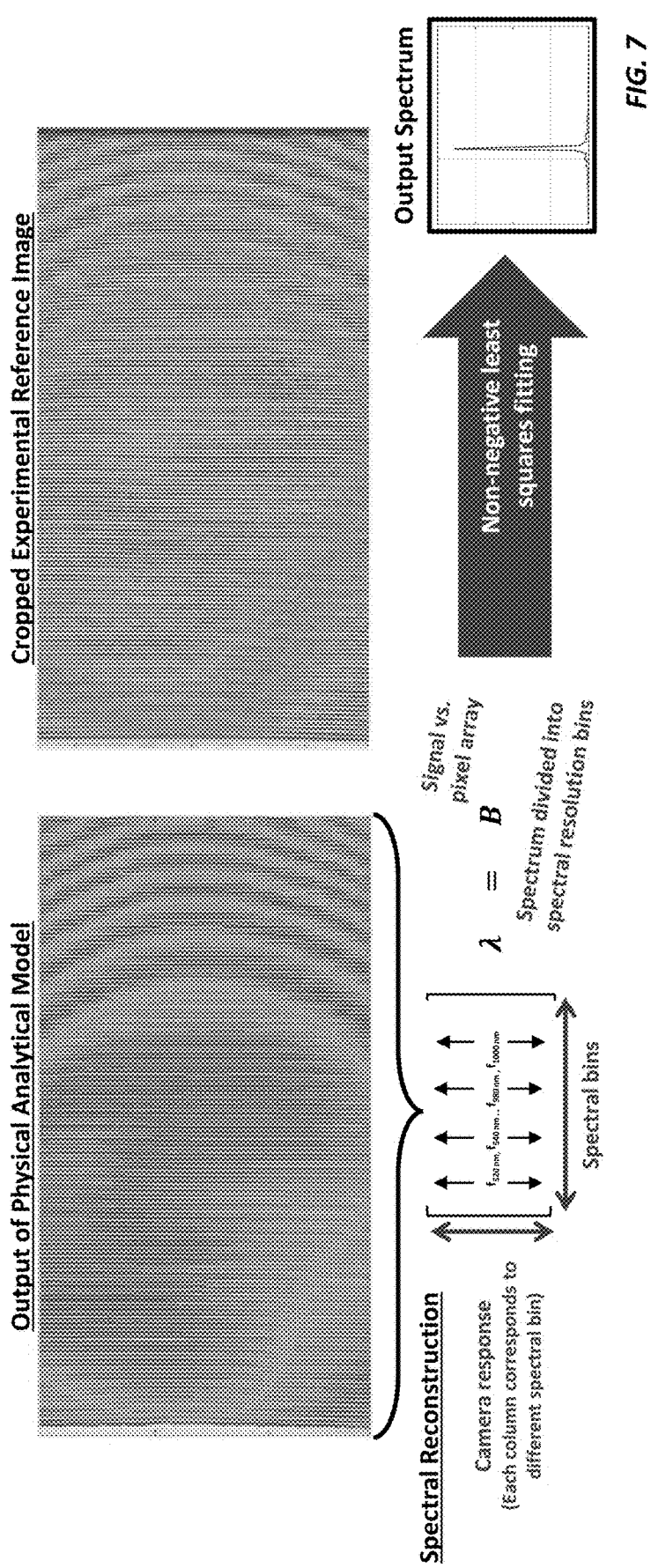
FIG. 7 illustrates a spectral reconstruction process suitable for processing data acquired by a computational spectrometer with a two-layer hybrid solid wedge etalon. The output image (left) of the physical analytical model for a single wavelength illumination agrees well with an experimentally captured image (right) under the same illumination conditions.

FIG. 7 illustrates the spectral reconstruction process using the physical analytical model constructed from the thickness measurements made according to the process 600 in FIG. 6. The upper left image in FIG. 7 is an example of the output of the physical analytical model across the entire two-layer hybrid solid wedge etalon for a single wavelength. The upper right image in FIG. 7 is an experimental image of two-layer hybrid solid wedge etalon under illumination at the same wavelength. The agreement is very good across the entire surface even crossing into the exposed portion of the substrate shown on the left side of each image.

With the validation of the physical analytical model for a single wavelength complete, the model is subsequently used to generate the entire set of wavelength responses, referred to as basis vectors, for use in the final least squares fitting processing step. A reconstruction matrix (lower left of FIG. 7) is populated with columns of predicted signal response for the various spectral bins. These columns are computed with the physical analytical model, which can in principle be used to correct for any temperature changes of the solid wedge etalon to account for thermal expansion and/or index of refraction changes.

The use of a physical analytical model allows for the computation and subsequent generation of basis vectors corresponding to different spectral resolutions. This is accomplished by computing the response at all wavelengths with a wavelength increment much smaller than the spectrometer's spectral resolution. The basis vectors with the desired spectral resolution are then computed by averaging the wavelength responses with equal weighting within the larger spectral resolution. For example, if the desired spectral resolution of the basis vectors is 5 nm and the physical analytical model computed the wavelength response in 1 nm increments, then five consecutive wavelength responses can be averaged together for each basis vector response. The calculations of wavelength response and averaging are done in wavenumber space as the wedge etalon operates in this space. Once a spectrum has been computed the resulting spectrum can be converted back to wavelength space for easier comparison with a test illumination spectrum. With the reconstruction matrix computed, the final step is the least-squares fitting to test images (lower right of FIG. 7). This should be a non-negative fitting process to agree with the physical processes, that is, wavelengths are either going to be present to the spectrometer or not. (It is unphysical to have negative contributions from a spectral bin basis vector.)

Performance of a Two-Layer Hybrid Solid Wedge Etalon

In order to evaluate the performance of a computational spectrometer with a two-layer hybrid solid wedge etalon, the computational spectrometer recorded a series of monochromatic test images spanning wavelength range detectable with the CMOS imager. In each case, a single image was recorded with the camera integration time set so that the average pixel count was roughly one quarter to one half of the pixel dynamic range. The images were cropped to match the region of interest computed by the physical analytical model and the few dark (bad) pixels had their values corrected to the nearest neighbor (good) pixel. The processing used the same reconstruction matrix generated with the physical analytical model; this reconstruction matrix need be is computed only once for each predetermined spectral resolution. The operating spectral bandwidth was set to 400-1000 nm to roughly match the response of the CMOS imager and wedge design provided about 4-5 pixel sampling of the shortest 400 nm wavelength fringe spacing.

Figure 8:
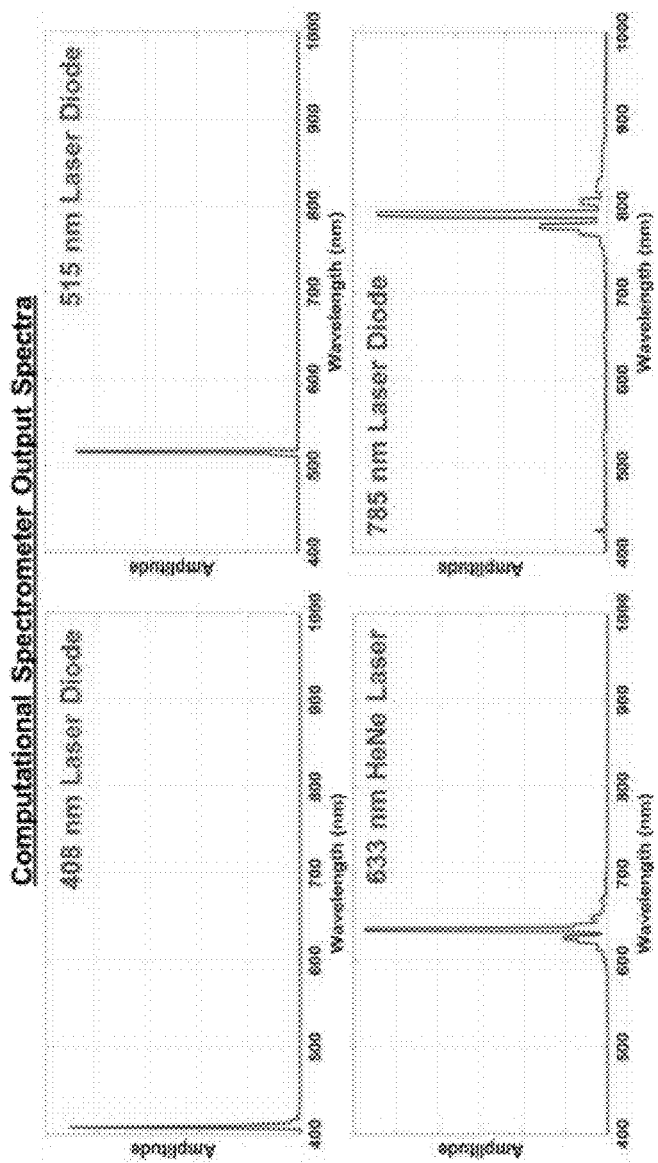
FIG. 8 shows single-snapshot output spectra of various monochromatic illumination test conditions acquired by a computational spectrometer with a two-layer hybrid solid wedge etalon.

FIG. 8 shows the results for four different monochromatic illumination test cases at wavelengths of 408 nm (upper left), 515 nm (upper right), 633 nm (lower left), and 785 nm (lower right). These results were obtained using spectral reconstruction with 114 $cm^{-1}$ spectral resolution, which is the predicted resolution of the computational spectrometer with Fourier-based reconstruction. The performance is quite good across the entire wavelength range, with peak widths much narrower than previously shown using Fourier-based processing. The 633 nm and 785 nm peaks both show some additional structure in the spectrum due to uncorrected defects and saturated pixels in the image. The spectra shown in FIG. 8 are averages of the individual spectra computed from each row of the imager. Spectra computed from individual rows agreed very well with the average spectrum due to each row providing redundant information. Averaging rows did reduce some noise but the benefit saturated after averaging <10 rows.

Figure 9:
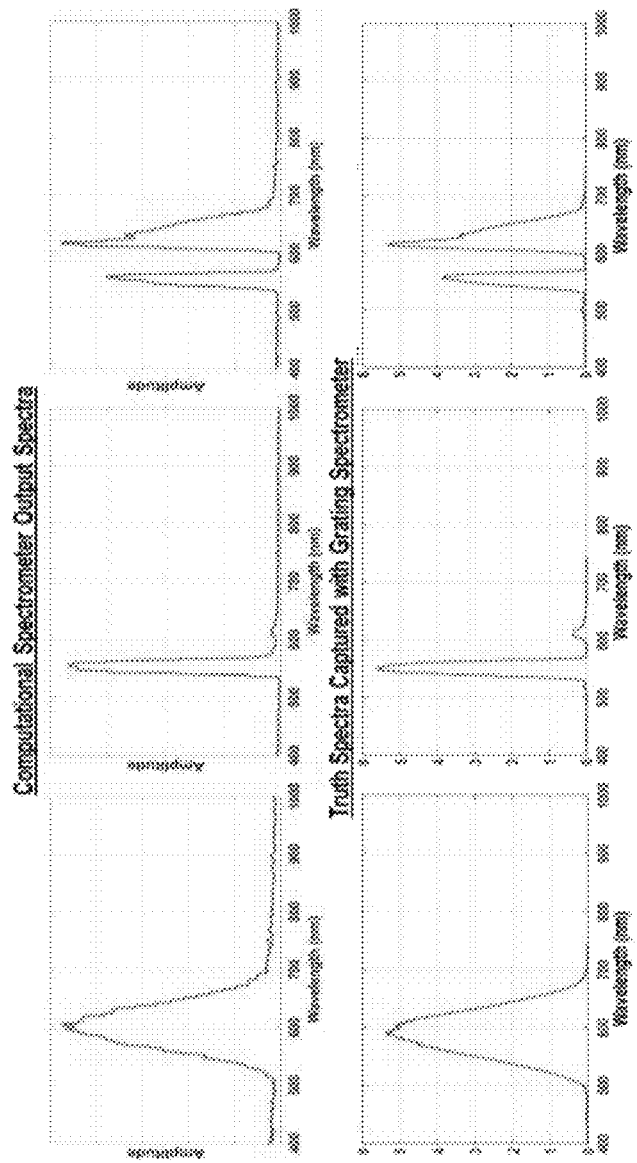
FIG. 9 shows single-snapshot output spectra of various broadband illumination test conditions captured by a computational spectrometer with a two-layer hybrid solid wedge etalon (upper row) and by a conventional grating spectrometer (lower row).
Figure 10:
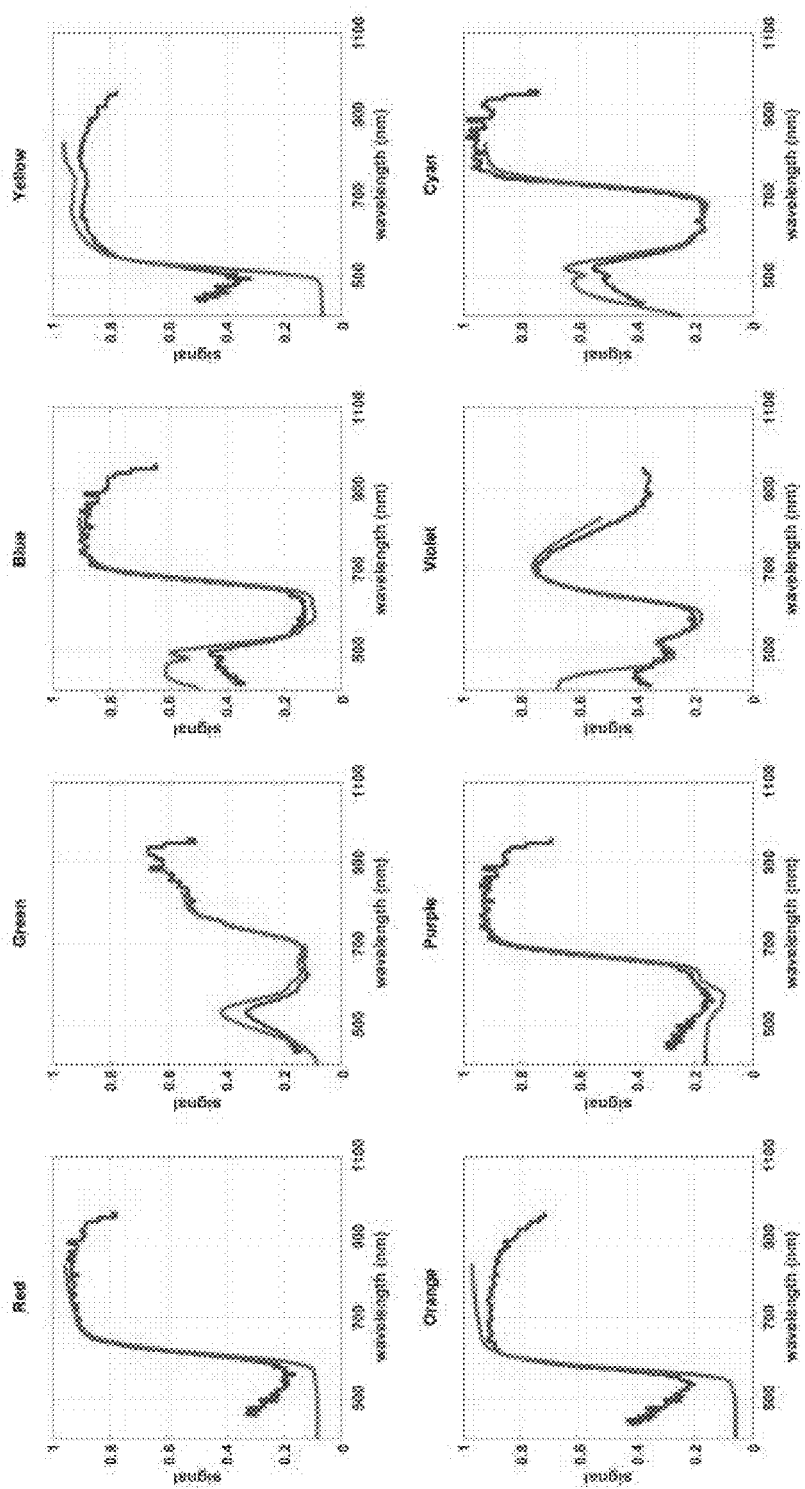
FIG. 10 shows reflectivity spectra of eight different reflectance standards of a two-layer hybrid solid wedge etalon configured and used as a hyperspectral imager compared to the reflectivities provided by the manufacturer of the reflectance standards.
Figure 11:
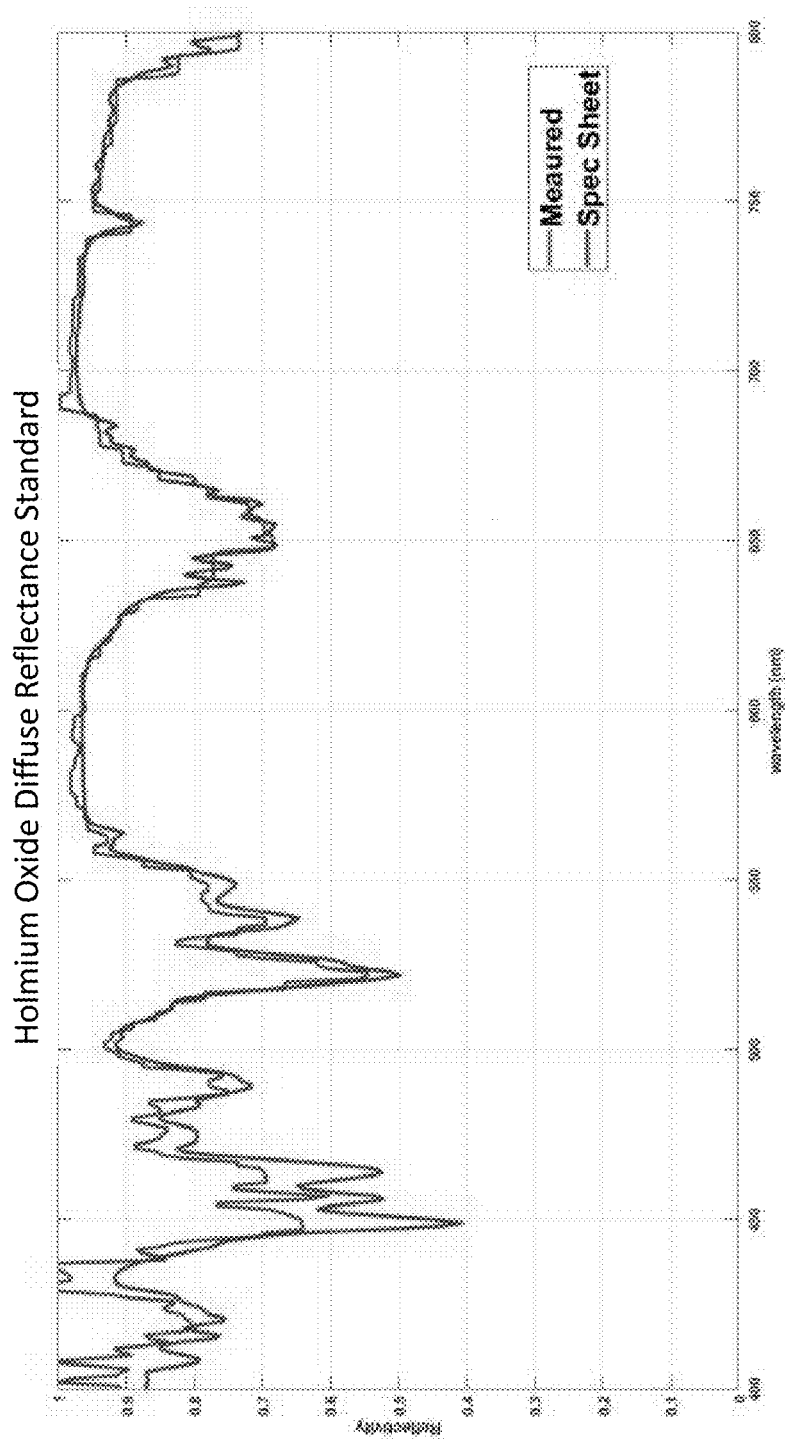
FIG. 11 shows a reflectivity spectrum of a holmium oxide reflectance standard measured with a two-layer hybrid solid wedge etalon configured and used as a hyperspectral imager compared to a reflectivity spectrum provided by the manufacturer of the holmium oxide reflectance standard.

FIGS. 9-11 show additional spectra collected with the computational spectrometer. The upper row of FIG. 9 shows the results of broadband illumination computed in an identical manner to the single monochromatic test cases with the same 114 $cm^{-1}$ spectral resolution. For comparison, the lower row of FIG. 9 shows spectra of the test illumination collected using a conventional grating spectrometer, with excellent agreement in all cases. FIGS. 10 and 11 shows reflection spectra of various reflectance color standards and a holmium oxide wavelength reflectance standard measured using the two-layer hybrid solid wedge etalon in a hyperspectral imaging configuration and compared with manufacturer-supplied data. The test standards were scanned across the imager, which collected multiple frames corresponding to when the test standard positioned shifted by an equivalent detector pixel. Data corresponding to a single spatial pixel on each test standard was extracted from the frames to create a signal vector that sampled all wedge thicknesses similar to the previous spectrometer configuration. The spectrum for this spatial pixel was then determined using the reconstruction process described above. There is excellent agreement for all standards.

The excellent agreement for both broadband and narrowband illumination demonstrates the capability of a computational spectrometer with a two-layer hybrid solid wedge etalon and the utility of the physical analytical model, which accurately reproduced spectra using a single image to extract thickness information from the wedge. This technique should offer further benefits to adjust to environmental and mechanical perturbations of packaged spectrometers. By knowing actual thickness information and material properties, such as CTE, adjustments can be made computationally to accurately include such effects.

To further evaluate the minimum spectral resolution, reconstruction matrices were generated using the physical analytical model with spectral resolutions of 11 $cm^{-1}$ and 29 $cm^{-1}$. These were subsequently used to compute spectra for the test cases in FIG. 8. For the narrow linewidth cases, the peak widths were further reduced, with the exception of the 633 nm and 785 nm peaks at 11 $cm^{-1}$ resolution. For cases analyzed at 29 $cm^{-1}$, the corresponding peak widths were 29 $cm^{-1}$, which is nearly four times narrower than the Fourier prediction of 114 $cm^{-1}$. This trend also nearly held for all cases going to 11 $cm^{-1}$, which is over an order of magnitude finer resolution.

Various metrics were used to analyze fractional power contained within the desired spectral bin and the remaining spectrum as well as Gaussian peak fitting. There was no distinguishable difference in the quality of the reconstructed spectra among the three spectral reconstruction methods except the previously mentioned 633 nm and 785 nm 11 $cm^{-1}$ cases, which appears to be attributable to images with the largest particle contamination artifacts. Based on this result, it is fairly reasonable to assume the actual spectral resolution of the two-layer hybrid solid wedge etalon computational spectrometer is <29 $cm^{-1}$ approaching 11 $cm^{-1}$, which is nearly an order of magnitude better than expected using traditional Fourier techniques.

Hyperspectral Imaging with a Two-Layer Solid Wedge Etalon

Figure 12:
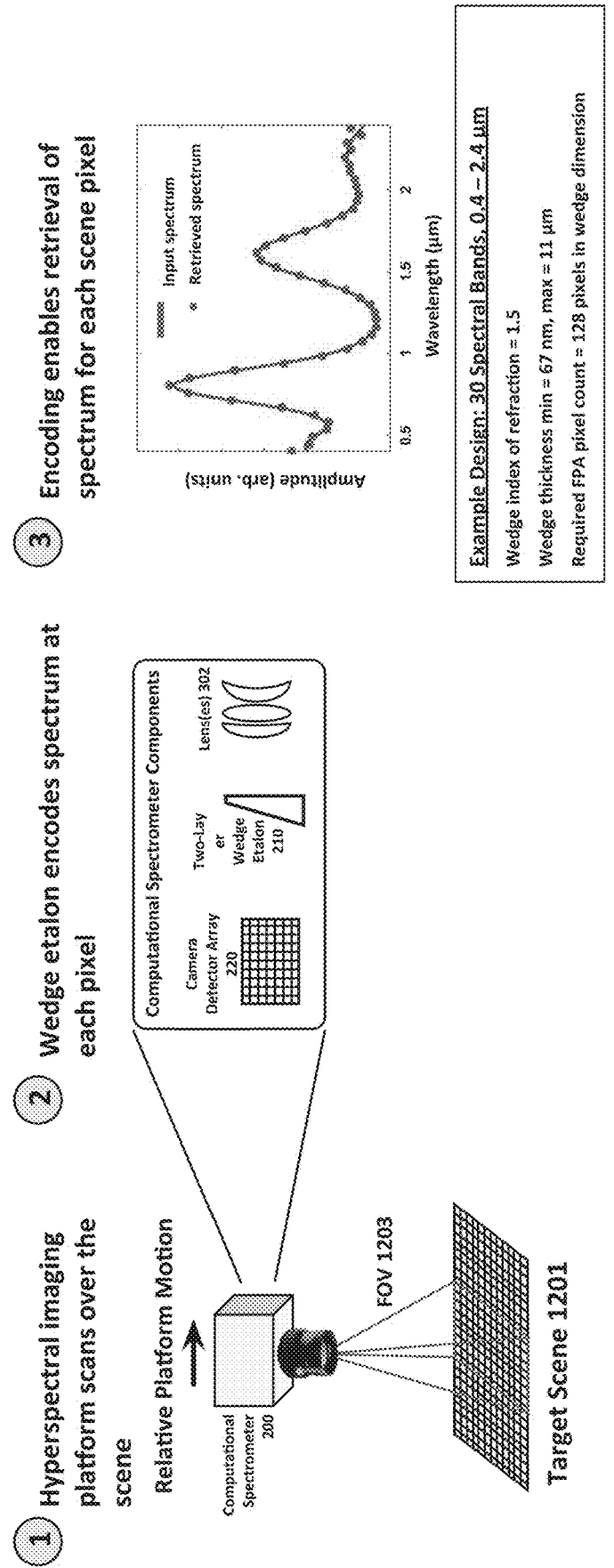
FIG. 12 illustrates an overview of hyperspectral imaging using a computational spectrometer with a one- or two-layer solid wedge etalon.
Figure 13:
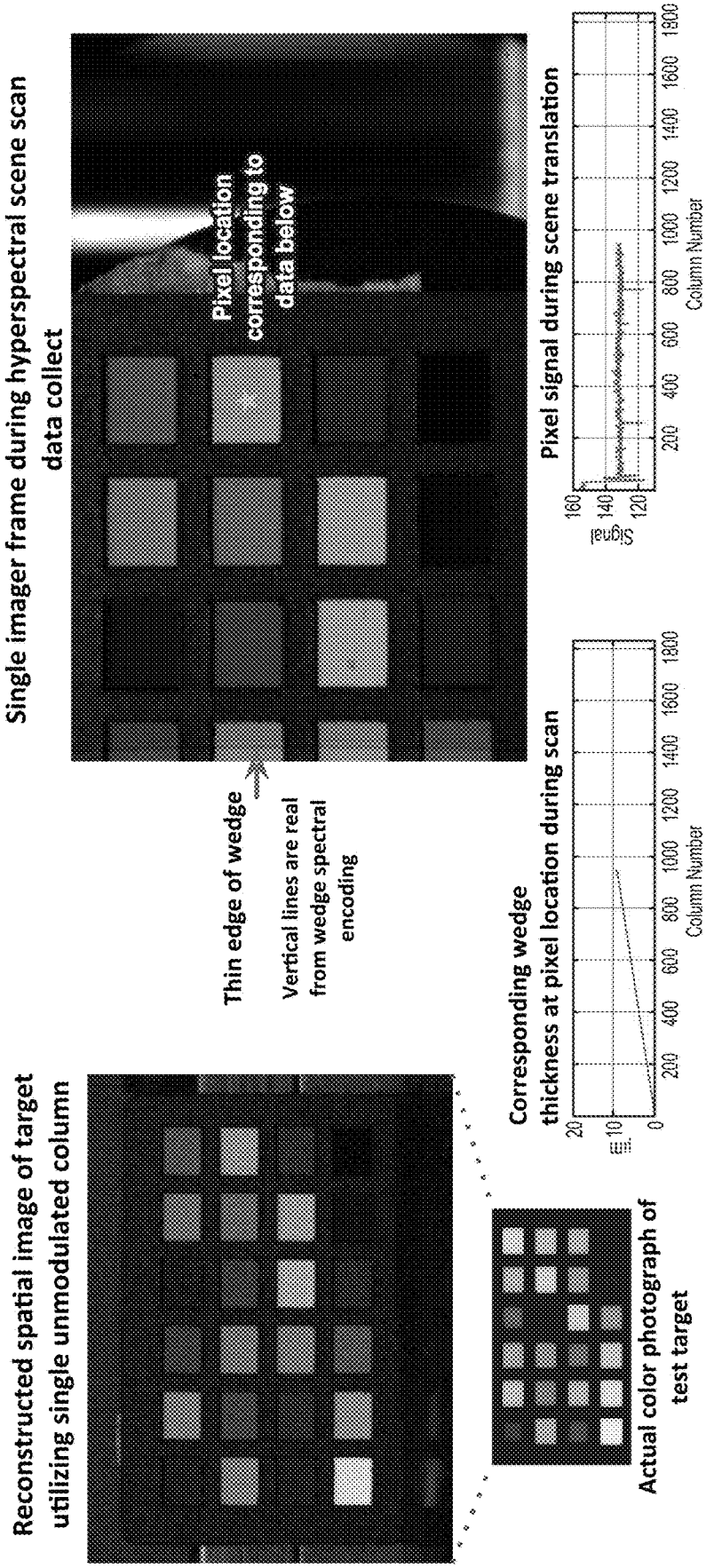
FIG. 13 illustrates the data collection process hyperspectral imaging with a solid etalon used to build up the three-dimensional data cube for spectral reconstruction.

FIGS. 12 and 13 illustrate hyperspectral imaging with the computational spectrometer 200 of FIGS. 2A-2D that includes a two-layer hybrid solid wedge. Compared to other hyperspectral imagers, a hyperspectral imager with a two-layer hybrid solid wedge can have much lower size, weight, and power consumption. They can also be more rugged because they don't need complex optics or gratings for fine spectral resolution.

FIG. 12 shows the physical arrangement and general scheme for processing the collected data. The computational spectrometer 200 acquires hyperspectral data as it moves with respect to a target scene 1201 within its field of view (FOV) 1203. The motion is in the direction of the gradient across the two-layer wedge etalon and can be relative motion; that is, the computational spectrometer 200 can be mounted on a moving platform, such as an airplane or unmanned aerial vehicle, that flies over the scene 1201. Alternatively, the computational spectrometer 200 can be mounted on a stationary mount and trained on a moving scene, such as a conveyor belt or assembly line. Or the computational spectrometer 200 and the scene 1201 can be fixed relative to each other, and a moving or rotating mirror or other component can scan light reflected or scattered from the scene 1201 across the computational spectrometer 200.

In operation, the two-layer wedge etalon 210 in the computational spectrometer 200 encodes the spectrum at each pixel in the detector array 220 facing the two-layer wedge etalon 210. At the same time, one or more columns at the edge of the detector array 220 capture unencoded light through the exposed portion 216 of the substrate 212 (FIGS. 2A and 2B). As the scene 1201 moves with respect to the computational spectrometer 200, the detector array 220 captures a series of interferograms at a frame rate high enough to reconstruct the image from these pixels at the edge of the detector array 220 without motion blur. These interferograms can be used to reconstruct the spectra and to create a hyperspectral image of the scene 1201 using a physical model of the two-layer wedge etalon 210 as described above with respect to FIGS. 6 and 7.

FIG. 12 includes a plot (right) of the spectrum measured with a single-layer solid wedge spectrometer (dots) compared to the input spectrum (line). Though not for data obtained with the computational spectrometer 200, this plot is useful for illustrating the thin and thick edge dimensions of a wedge for this VNIR/SWIR band. The single-layer solid wedge spectrometer used to capture this spectrum was designed to resolve 30 spectral bins over a band from 0.4-2.4 µm. It had a single-element wedge with a refractive index of 1.5, a minimum thickness of 67 nm, and a maximum thickness of 11 µm. The focal plane array (detector array) had 128 pixels in the wedge dimension.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spectrometer comprising:
a solid wedge etalon to generate a spatial interference pattern from a polychromatic object, the solid wedge etalon comprising a wedged layer having a first refractive index disposed on a substrate having a second refractive index lower than the first refractive index;
a detector array, in optical communication with the solid wedge etalon, to detect the spatial interference pattern generated by the solid wedge etalon; and
a processor, operably coupled to the detector array, to reconstruct a spectrum of the polychromatic object based at least in part on the spatial interference pattern and on a model of a spectral response of the solid wedge etalon,
wherein the model of the spectral response of the solid wedge etalon is based at least in part on a minimum thickness of the solid wedge etalon, a maximum thickness of the solid wedge etalon, and a wedge angle of the solid wedge etalon.

2. The spectrometer of claim 1, wherein the wedged layer has a maximum thickness of about 10 microns to about 500 microns.

3. The spectrometer of claim 1, wherein the substrate has a maximum thickness of about 1 millimeter to about 10 millimeters.

4. The spectrometer of claim 1, wherein the wedge angle is less than about 1 degree.

5. The spectrometer of claim 1, wherein the wedged layer is diffusion bonded to the substrate and polished to form the wedge angle of the solid wedge etalon.

6. The spectrometer of claim 1, wherein the wedged layer is deposited on the substrate and polished to form the wedge angle of the solid wedge etalon.

7. The spectrometer of claim 1, wherein a portion of the substrate is polished at the wedge angle and extends beyond the wedged layer.

8. The spectrometer of claim 1, wherein the wedged layer comprises at least one of $TiO_2$, $Nb_2O_5$, or ZnS and the substrate comprises at least one of Infrasil 302 glass or BK7 glass.

9. The spectrometer of claim 1, wherein the wedged layer has a first thermal coefficient of expansion and the substrate has a second thermal coefficient of expansion within 30% of the first thermal coefficient of expansion.

10. The spectrometer of claim 1, wherein the first refractive index is at least 2 and the second refractive index is no more than 1.5.

11. The spectrometer of claim 1, wherein the substrate has a thickness that varies away from the wedged layer and the model of the spectral response is based at least in part on the thickness of the substrate.

12. The spectrometer of claim 1, wherein the model of the spectral response is derived from a monochromatic reference image acquired with the spectrometer, a dispersion of the wedged layer, and a dispersion of the substrate.

13. A method of spectroscopy with a solid wedge etalon comprising a wedged layer having a first refractive index disposed on a substrate having a second refractive index lower than the first refractive index, the method comprising:

generating a model of a spectral response of the solid wedge etalon based on a two-dimensional thickness map of the wedged layer, a dispersion of the wedged layer, a two-dimensional thickness map of the substrate, and a dispersion of the substrate;
detecting, with a detector, spatial interference patterns generated by imaging a scene through the solid wedge etalon while scanning the detector across the scene; and
generating a hyperspectral image of the scene based on the spatial interference patterns and the model of the spectral response of the solid wedge etalon.

14. The method of claim 13, wherein generating the hyperspectral image comprises performing a non-negative least squares fitting.

15. The method of claim 13, wherein detecting the spatial interference patterns comprises detecting light transmitted by the wedged layer and detecting light transmitted through a portion of the substrate extending beyond an edge of the wedged layer.

16. The method of claim 13, further comprising:
detecting a reference spatial interference pattern generated by imaging a monochromatic image through the solid wedge etalon; and
determining the two-dimensional thickness map of the wedged layer and the two-dimensional thickness map of the substrate based on the reference spatial interference pattern.

17. The method of claim 16, wherein determining the two-dimensional thickness map of the wedged layer comprises locating peaks in the reference spatial interference pattern produced by the wedged layer.

18. The method of claim 16, wherein determining the two-dimensional thickness map of the substrate comprises identifying at least one spatial frequency associated with the substrate in the reference spatial interference pattern and determining a thickness of the substrate based on the at least one spatial frequency.

19. The method of claim 13, further comprising:
measuring a temperature of the solid wedge etalon; and
adjusting the model based on the temperature of the solid wedge etalon.

20. The method of claim 13, further comprising:
measuring a pointing angle of the solid wedge etalon; and
adjusting the model based on the pointing angle of the solid wedge etalon.

* * * * *